US012812072B2

(12) United States Patent
Vasoya et al.

(10) Patent No.: US 12,812,072 B2
(45) Date of Patent: Nov. 24, 2026

(54) VEHICULAR TRAILER ASSIST SYSTEM

(71) Applicant: Magna Electronics Inc., Auburn Hills, MI (US)

(72) Inventors: Jigneshkumar Natvarlal Vasoya, Brampton (CA); Shweta Suresh Daga, Maharashtra (IN); Aditya Kumar Jain, Gujarat (IN); Akshata Anant Desai, Maharashtra (IN)

(73) Assignee: Magna Electronics Inc., Auburn Hills, MI (US)

( * ) Notice: Subject to any disclaimer, the term of this patent is extended or adjusted under 35 U.S.C. 154(b) by 25 days.

(21) Appl. No.: 19/037,374

(22) Filed: Jan. 27, 2025

(65) Prior Publication Data

US 2025/0175582 A1 May 29, 2025

Related U.S. Application Data

(62) Division of application No. 17/305,341, filed on Jul. 6, 2021, now Pat. No. 12,212,894.

(Continued)

(51) Int. Cl.

| | |
|---|---|
| ***G06V 20/58*** | (2022.01) |
| ***B60W 60/00*** | (2020.01) |
| ***G05D 1/00*** | (2006.01) |
| ***G05D 1/249*** | (2024.01) |
| ***G06F 18/21*** | (2023.01) |

(Continued)

(52) U.S. Cl.

CPC ........ *H04N 7/183* (2013.01); *B60W 60/0025* (2020.02); *G05D 1/0246* (2013.01); *G05D 1/249* (2024.01); *G06F 18/21* (2023.01); *G06F 18/2431* (2023.01); *G06N 3/04* (2013.01); *G06N 3/08* (2013.01); *G06T 7/70* (2017.01); *G06V 10/82* (2022.01); *G06V 20/58* (2022.01); *G06V 20/584* (2022.01); *H04N 23/90* (2023.01);

(Continued)

(58) Field of Classification Search

CPC ............... B60W 60/0025; G06F 18/21; G06F 18/2431; G06N 3/04; G06N 3/08; G06T 7/70; G06T 2207/20084; G06T 2207/30252; G06V 20/584; H04N 23/90

See application file for complete search history.

(56) References Cited

U.S. PATENT DOCUMENTS

2018/0215382 A1* 8/2018 Gupta ...................... B60D 1/36
2019/0016264 A1* 1/2019 Potnis .................... B60D 1/245

(Continued)

*Primary Examiner* — Kenneth J Malkowski
(74) *Attorney, Agent, or Firm* — HONIGMAN LLP

(57) ABSTRACT

A vehicular trailer assist system includes a camera disposed at a rear portion of a vehicle and viewing at least rearward of the vehicle, and an electronic control unit (ECU), which includes an image processor for processing image data captured by the camera. The ECU executes a deep convolutional neural network (CNN) to determine, via processing of image data captured by the camera, presence of a trailer rearward of the vehicle. The CNN, responsive to processing of image data captured by the camera, determines a position of a trailer relative to the vehicle. The CNN, responsive to determining the position of the trailer, classifies the trailer into a trailer category. The ECU, responsive to the CNN determining the position of the trailer, generates an output based on the trailer classification to autonomously control the vehicle to align the vehicle with the trailer and navigate the vehicle toward the trailer.

9 Claims, 17 Drawing Sheets

Related U.S. Application Data

(60) Provisional application No. 62/705,578, filed on Jul. 6, 2020.

(51) Int. Cl.

| | |
|---|---|
| ***G06F 18/2431*** | (2023.01) |
| ***G06N 3/04*** | (2023.01) |
| ***G06N 3/08*** | (2023.01) |
| ***G06T 7/70*** | (2017.01) |
| ***G06V 10/82*** | (2022.01) |
| ***H04N 7/18*** | (2006.01) |
| ***H04N 23/90*** | (2023.01) |

(52) U.S. Cl.

CPC ............... *G06T 2207/20081* (2013.01); *G06T 2207/20084* (2013.01); *G06T 2207/30252* (2013.01)

(56) References Cited

U.S. PATENT DOCUMENTS

2020/0135030 A1* 4/2020 Krivokon ............. G05D 1/0088
2021/0096247 A1* 4/2021 Ishikawa ................... G01P 3/00

* cited by examiner

22a

22b

FIG. 2C
FIG. 2D
Horse Trailer
Utility (Close) Trailer

22c

22d

FIG. 2E
FIG. 2F
Camper Trailer
Utility (Open) Trailer

22e

22f

22g

22h

22i

22j

22k

22m

FIG. 5A
FIG. 5B
Sunny + Backlight
Night + Wet Road

22n

22o

FIG. 5C
FIG. 5D
Similar Object
Snow + Sunny + Similar Background Color

22p

22q

FIG. 5E
FIG. 5F
Overcast + Tree Background
Evening + Backlight

22r

22s

122a

GA_left / GC / GA_up_right

Distance: Far
Environment: Cloudy

122b

GA_up_left / GA_right

Distance: Medium
Environment: Cloudy

Distance: Short
Environment: Shadow

Distance: Medium
Environment: Sunlight (front), Similar appearing symbols

100

| Test System Specification | | |
|---|---|---|
| Operating system | Windows 10 Professional (64 bit) | |
| Processor | Intel Core i7-7700 CPU @ 3.60 GHz | |
| RAM | 16.0 GB | |
| **Performance Specification** | | |
| **Performance category** | **Trailer Detection (TD)** | **Traffic Light Detection (TLD)** |
| Input image resolution | Any (e.g. 640 x 400, 1280 x 800) | Any (e.g. 1920 x 1080) |
| Input image type | 8 Bit (Number of channels: 1) | 24 Bit (Number of channels: 3) |
| Detection speed (fps) | 16 | 16 |
| Detection accuracy (mAP) | 96% | 94% |
| Memory requirement (model size) | 3.24 MB | 3.34 MB |
| Number of detection categories | 6 (e.g. Box_Black, Box_Gray, Horse, Camper, Utility_Close, Utility_Open) | 10 (e.g. GA_left, GA_right, GA_up_left, GA_up_right, GC_GA_left, GC_GA_right, GA_up, GC, RA_left, RC) |
| Detection distance range | 0 meter to 10 meter | Subjective: Short, Medium, Far |
| Object orientation range | 0° to 60° | NA |
| Environment conditions | Sunny, Cloudy, Rainy, Shadow | Sunny, Cloudy, Shadow, Occlusion |
| Road conditions | Asphalt, Concrete, Snow | Concrete |

FIG. 11

VEHICULAR TRAILER ASSIST SYSTEM

CROSS REFERENCE TO RELATED APPLICATIONS

The present application is a continuation of U.S. patent application Ser. No. 17/305,341, filed Jul. 6, 2021, now U.S. Pat. No. 12,212,894, which claims the filing benefits of U.S. provisional application Ser. No. 62/705,578, filed Jul. 6, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

A driver assistance system or vehicular vision system or trailering assist system for a vehicle utilizes one or more cameras to capture image data representative of images exterior of the vehicle, and provides a camera disposed at a rear portion of a vehicle viewing exterior of the vehicle. The system also includes a control or an electronic control unit (ECU) including electronic circuitry and associated software. The electronic circuitry of the ECU includes an image processor for processing image data captured by the camera. The ECU executes a deep neural network (DNN) to determine presence of a trailer in image data captured by the camera. The DNN, responsive to processing of image data captured by the camera, determines a position of a trailer in the captured image data and the DNN, responsive to determining the position of the trailer, classifies the trailer into one of a plurality of trailer categories. The ECU, responsive to the DNN determining the position of the trailer and based on the classification, autonomously aligns the vehicle with the trailer and navigates the vehicle toward the trailer.

These and other objects, advantages, purposes and features of the present invention will become apparent upon review of the following specification in conjunction with the drawings.

BRIEF DESCRIPTION OF THE DRAWINGS

FIG. 11 is a table of exemplary components of the trailer assist system.

DESCRIPTION OF THE PREFERRED EMBODIMENTS

A vehicle and trailer maneuvering system or trailering assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Figure 1:
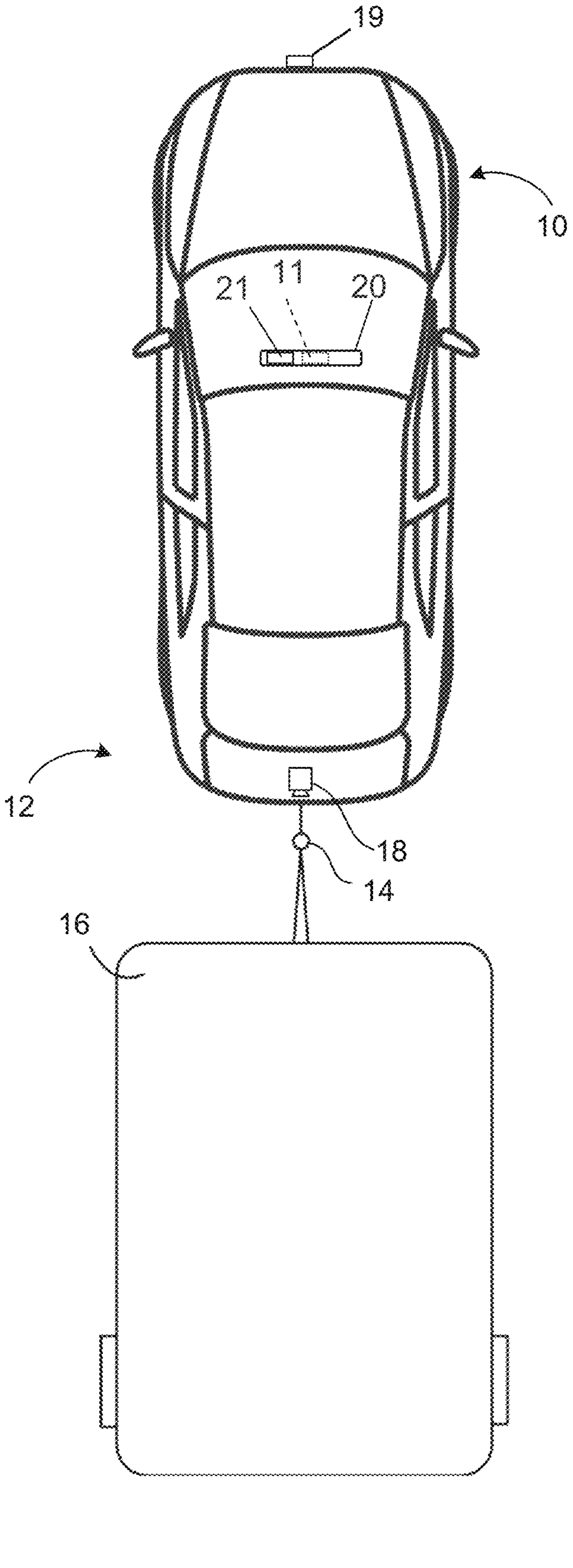
FIG. 1 is a plan view of a vehicle with a trailer hitch assist system that is operable to maneuver the vehicle towards a trailer to couple the trailer with the vehicle via a hitch.

Referring now to the drawings and the illustrative embodiments depicted therein, a vehicle 10 includes a trailer hitch assist system or maneuver assist system 12 that is operable to assist in backing up or reversing the vehicle 10 equipped with the trailer hitch assist system 12 to a trailer 16 to couple the trailer with the vehicle 10 via, for example, hitch 14 and may optionally further maneuver the vehicle 10 and trailer 16 toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10, which includes the hitch 14 and/or trailer 16, with the camera 18 having a lens for focusing images at or onto an imaging array or imaging plane or imager of the camera (FIG. 1). Optionally, a forward viewing camera 19 may be disposed at the front of the vehicle 10, such as at the front bumper or the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) 11 or processor that is operable to process image data captured by the camera or cameras and may detect objects or the like and/or provide displayed images at a display device 21 for viewing by the driver of the vehicle. Although the control 11 and display device 21 are shown as part of or incorporated in or at an interior rearview mirror assembly 20 of the vehicle 10, the control and/or the display device may be disposed elsewhere at or in the vehicle. The data transfer or signal communication from the camera or cameras to the ECU may comprise any suitable data or communication link, such as a vehicle network bus or the like of the equipped vehicle.

Object detection (OD) is an important part in developing various advanced driver-assistance systems (ADAS). Object detection systems typically capture images exterior of the vehicle detect and identify various objects at or near the vehicle and/or in a current or predicted path of vehicle. Modern deep neural network techniques may be used to solve complex problems like object detection, semantic segmentation and other problems in the ADAS domain.

For example, Trailer Hitch Assist (THA) is a rear vehicle camera feature on vehicles which assists the driver by autonomously or semi-autonomously maneuvering the vehicle in reverse to the trailer coupler of a trailer. Object detection techniques may be applied to THA systems to include detection of various trailer types at different distance ranges, in different environment conditions, and on different road types, etc. Similarly, object detection may be applied to other ADAS systems and used for detection of other objects such as traffic lights. For example, detecting or determining the current state of the traffic light is very useful for driver assistance and automated driving functions of a vehicle.

Implementations herein include a lightweight deep neural network (DNN) based object detection method that detects and identifies various objects at or near a path of a vehicle from image data captured using a camera or imaging sensor installed on or at the vehicle. The DNN may be trained using images and/or image data (such as video images derived from captured image data) to determine presence of an object (such as a trailer) present in the captured image data and to determine a position of the determined object relative to the equipped vehicle. The DNN may be trained to identify the object in various environments (e.g., sunny, cloudy, raining) and/or situations (e.g., other objects and obstacles in the vicinity of the vehicle or determined object) and/or may be trained to determine qualities or characteristics of the determined object. For example, a DNN such as a tiny single-shot detection deep convolutional neural network (CNN) such as a Tiny SSD with SqueezeNet architecture may detect trailer positions and identify a trailer category. The DNN model may use a Caffe framework. This DNN method is scalable, memory efficient, fast, robust and accurate for trailer detection and category identification. The techniques herein may be extended to detect trailer orientation for optimal path estimation, coupler detection, and detection of various obstacles (e.g., pedestrians, other vehicles etc.) while automatically maneuvering the vehicle back to the trailer. Optionally the techniques also include traffic light/signal detection and traffic light categorization. The techniques may also be applied to various ADAS applications such as obstacle detection, road sign detection, face detection, THA, traffic jam determination (TJD), etc.

The electronic control unit (ECU) or control 11 or other processor of the vehicle of the system 12 executes a trailer detection DNN that is capable of localizing the trailer and identifying a type or category of trailer from image data captured using the rear camera 18 in order to assist the driver with maneuvering the vehicle back to the trailer coupler without the need for manual steering, acceleration or brake input by the driver. The system also automatically aligns the vehicle with the trailer up to a point where the trailer coupler only needs to be lowered onto the hitch. Executing the DNN to identify the type or category of trailer may help the system to more quickly and/or more accurately determine a path for the vehicle to the trailer coupler.

The DNN may be trained in various conditions and orientations to determine presence of an object present in image data captured by the camera, determine a location or position of the determined object relative to the vehicle, and optionally determine a category of the determined object. For example, the trailer detection DNN is trained to locate and categorize a number of trailer types (e.g., box, horse, camper, utility (closed, open), etc.). The trailer detection DNN may recognize the trailer at a variety of trailer orientations relative to the vehicle (e.g. 0 degrees to 60 degrees) and at various trailer distances from the vehicle (e.g., 0 m to 10 m). The system may also localize and identify the trailer regardless of the environment (e.g., sunny, cloudy, rainy, overcast, shadow, etc.), illumination levels (e.g., day, evening, night), road types (e.g., asphalt, concrete, snow, dry road, wet road, etc.), and background (e.g., trees, buildings, open space, similar to the trailer color, etc.). The DNN is trained on a plurality (e.g., thousands) of images depicting various trailers and environmental conditions that the system is to detect during normal operation. For example, the images may include black box trailers, gray box trailers, horse trailers, camper trailers, and both open and closed top utility trailers during various times of day, various weather conditions, and on various types of road. Thus, the system may be trained to more quickly and easily determine presence of and recognize an object despite conditions and orientations of the camera relative to the object that may affect the captured image data. The system may be trained offline (e.g., during manufacture of the vehicle or installation of the system at the vehicle), during a training session (e.g., where the system determines presence and a condition of an object and a driver of the vehicle indicates whether the determination is correct or incorrect), and/or the system may be trained or retrained or tuned during normal operation of the vehicle. For example, the system may perform further unsupervised learning using image data captured during normal use of the system. The system may perform further supervised learning by requesting feedback from an operator of the vehicle (e.g., requesting the operator to identify a trailer type of a trailer, etc.).

Figure 2A:
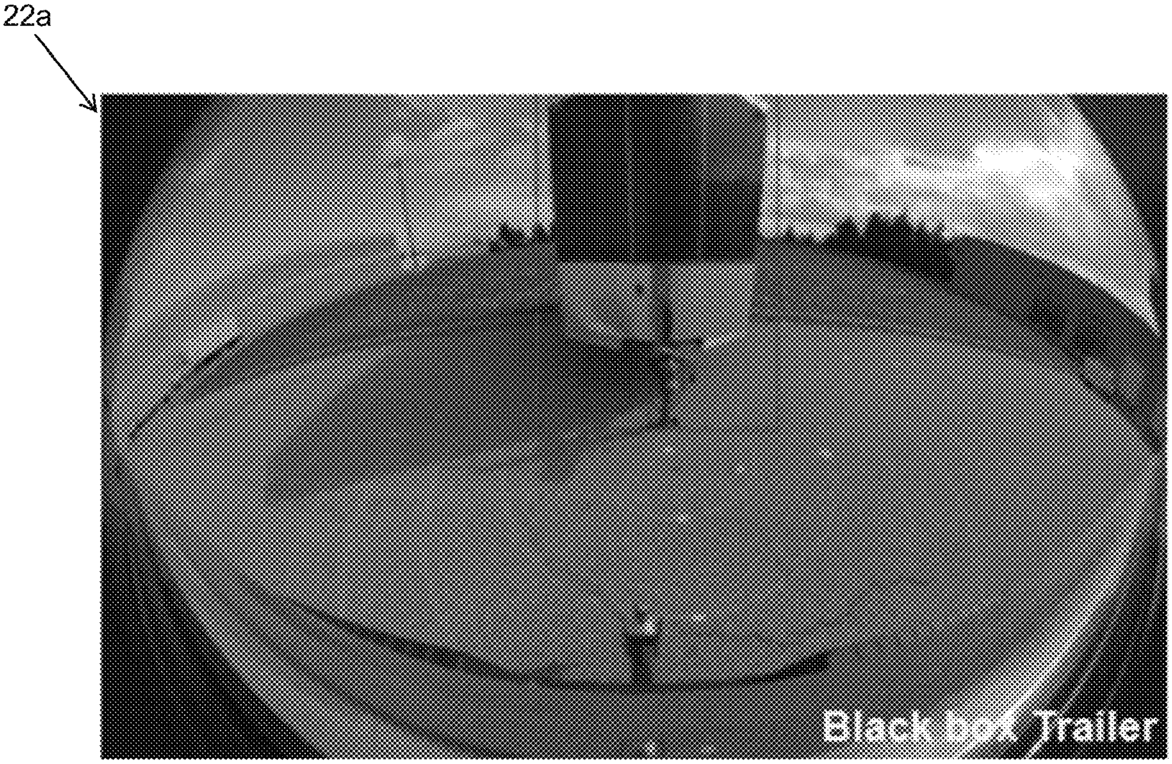
FIGS. 2A-2F are exemplary images of captured image data representative of trailers of various trailer types.
Figure 2B:
Figure 2C:
Figure 2D:
Figure 2E:
Figure 2F:
Figure 3A:
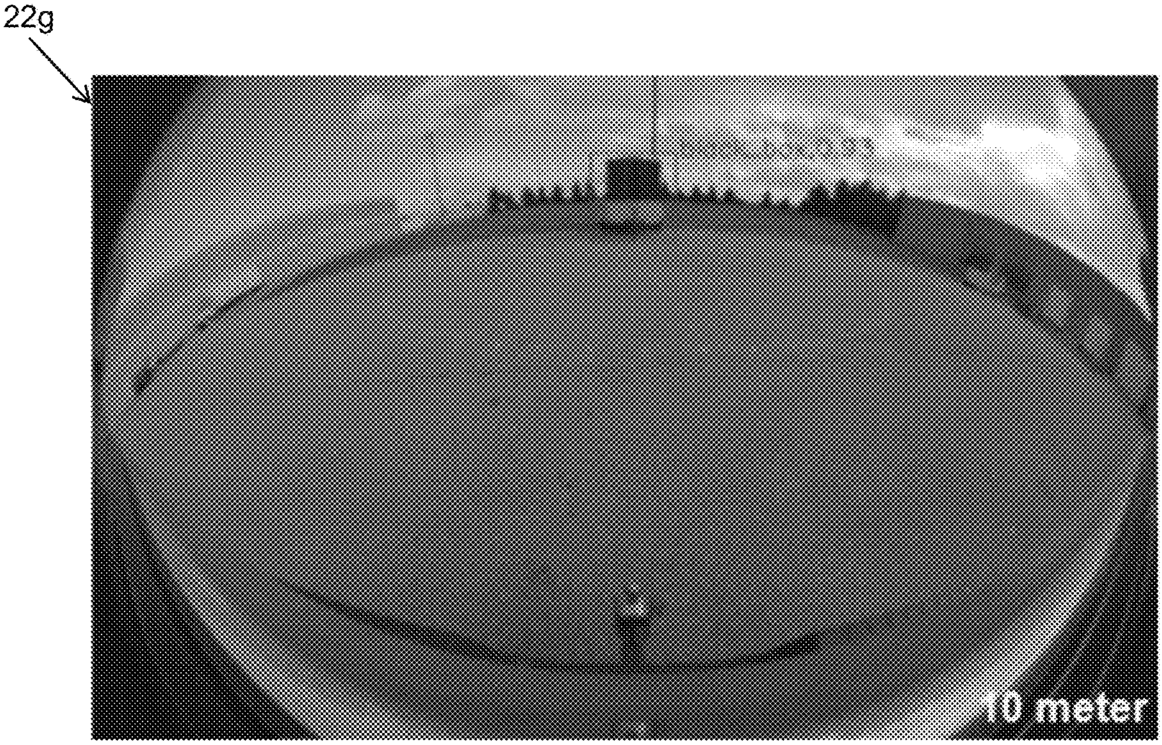
FIGS. 3A-3C are exemplary images of captured image data representative of trailers at various distances relative to the vehicle.
Figure 3B:
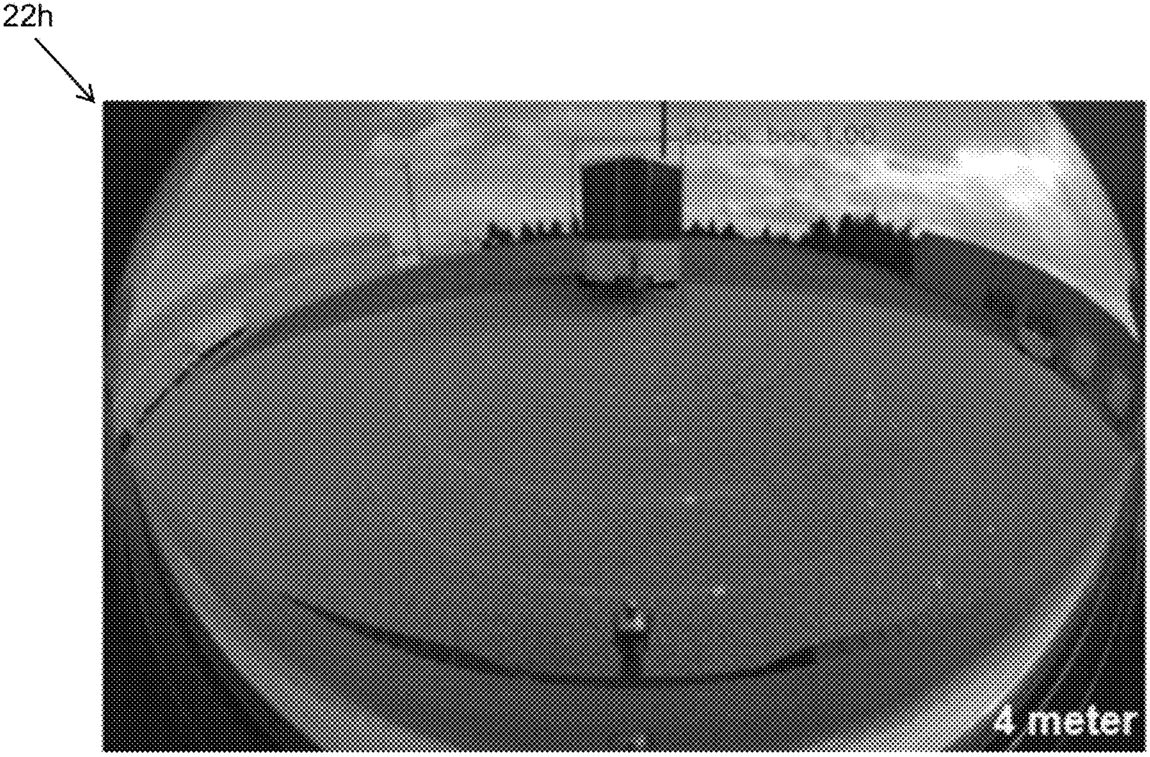
Figure 3C:
Figure 4A:
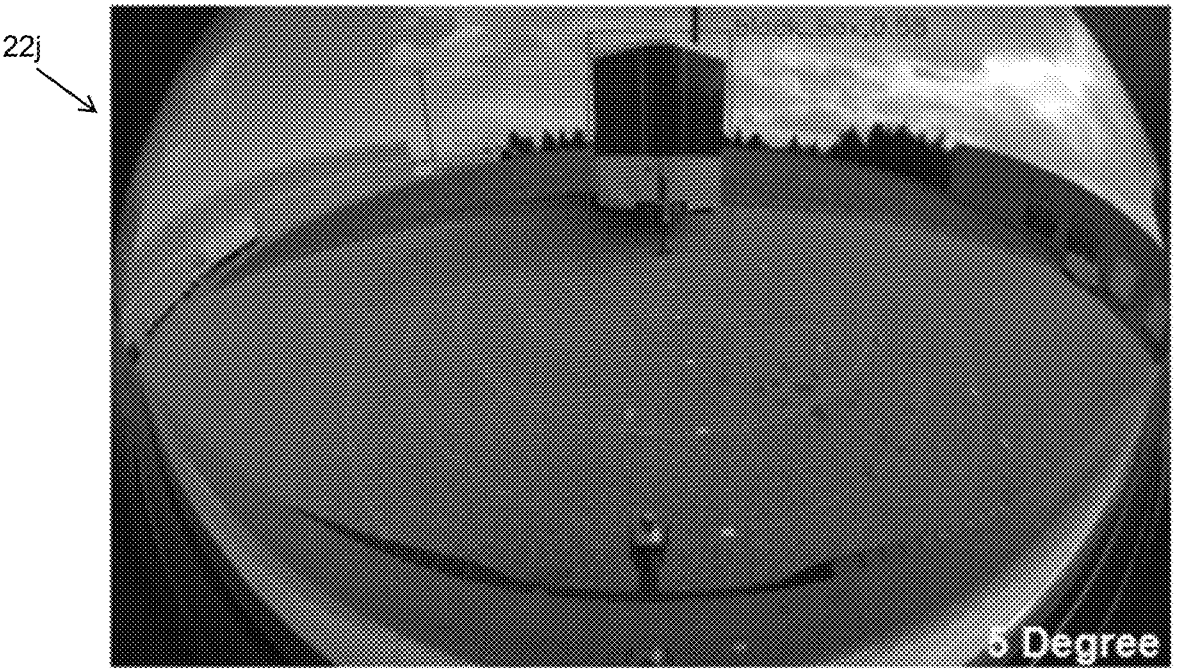
FIGS. 4A-4C are exemplary images of captured image data representative of trailers at various orientations relative to the vehicle.
Figure 4B:
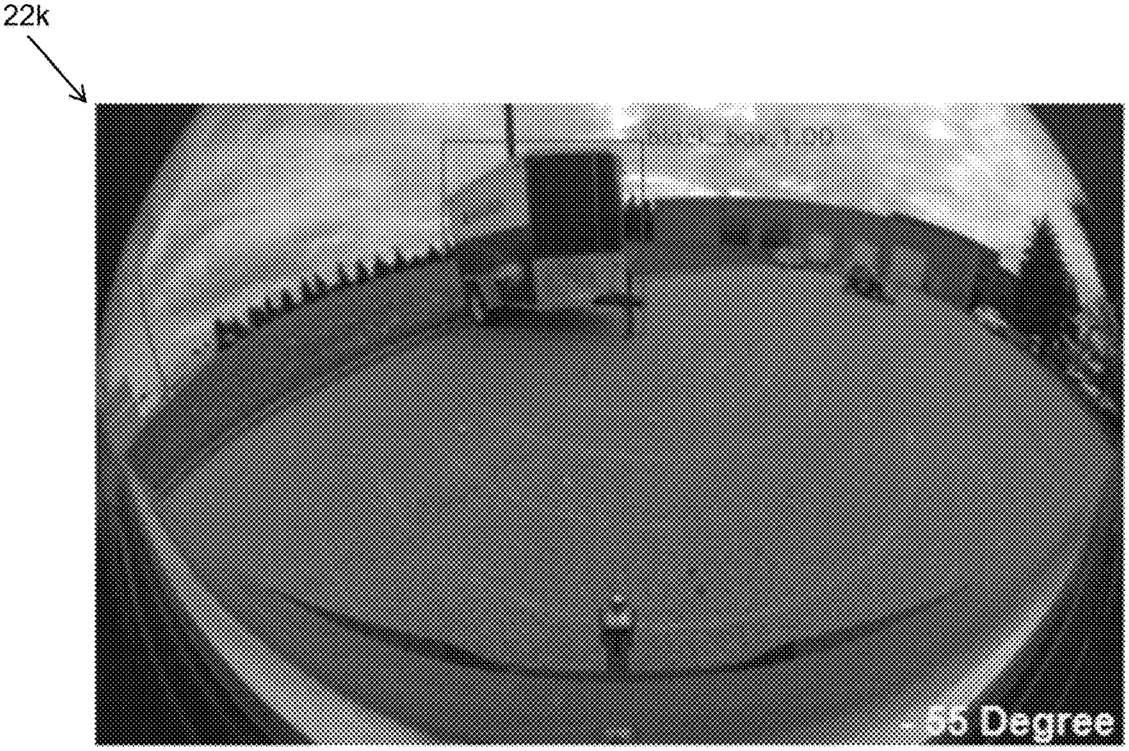
Figure 4C:
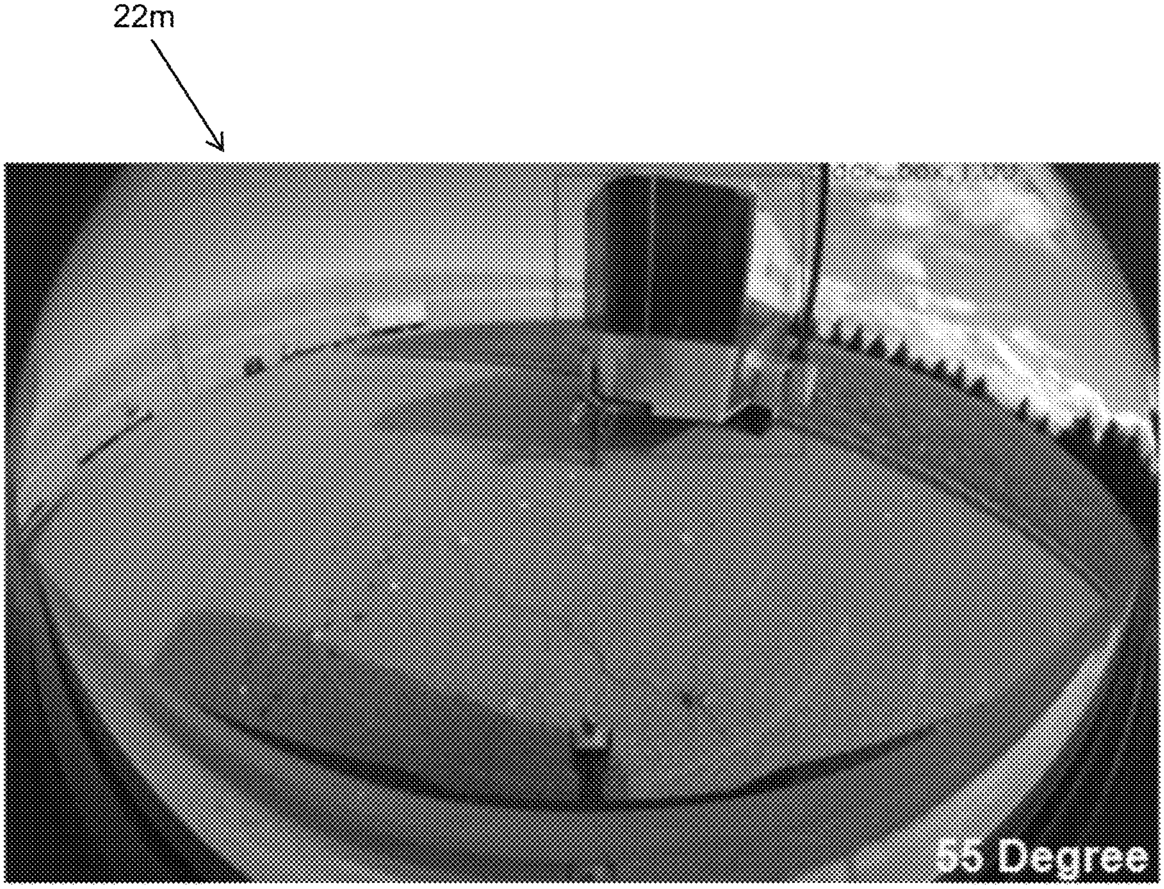
Figure 5A:
FIGS. 5A-5F are exemplary images of captured image data representative of trailers in various environmental conditions.
Figure 5B:
Figure 5C:
Figure 5D:
Figure 5E:
Figure 5F:

Referring now to FIGS. 2A-2F, examples of captured image data 22*a*-22*f* representative of various trailer types that may be used for training the DNN are illustrated. For example, FIG. 2A illustrates an image 22*a* of a black box trailer, while FIG. 2B illustrates an image 22*b* of a gray box trailer. FIG. 2C illustrates an image 22*c* of a horse trailer, FIG. 2D illustrates an image 22*d* of a utility trailer in a closed position (i.e., a closed top or covered utility trailer), and FIG. 2E illustrates an image 22*e* of a camper trailer. FIG. 2F illustrates an image 22*f* of a utility trailer in an open position (i.e., an open top or uncovered utility trailer). Similarly, FIGS. 3A-3C illustrate example training images 22*g*-22*i* representative of the trailer at varying distances. That is, FIG. 3A illustrates an image 22*g* of a trailer at a distance of 10 m, FIG. 3B illustrates an image 22*h* of a trailer at a distance of 4 meters, and FIG. 3C illustrates an image 22*i* of a trailer of a distance of less than 0.5 m. FIGS. 4A-4C illustrate image data 22*j*, 22*k*, 22*m* representative of the trailer in various orientations relative to the vehicle. Specifically, FIG. 4A illustrates an image 22*j* of a trailer at a 5 degree orientation relative to the camera and/or vehicle, FIG. 4B illustrates an image 22*k* of a trailer at a 55 degree orientation, and FIG. 4C illustrates an image 22*m* of a trailer at a 55 degree orientation. In further examples, FIGS. 5A-5F illustrate image data 22*n*-22*s* representative of the trailer in various environmental variations. FIG. 5A illustrates an image 22*n* of the trailer in a backlit and sunny environment, FIG. 5B illustrates an image 22*o* of the trailer on a wet road in a night environment, and FIG. 5C illustrates an image 22*p* of the trailer near similar objects (in this instance, other vehicles). FIG. 5D illustrates an image 22*q* of the trailer in a snowy and sunny environment where the trailer is a similar color to the background, FIG. 5E illustrates an image 22*r* of the trailer with an overcast environment with trees in the background, and 5F illustrates an image 22*s* with a trailer in a backlit environment during the evening.

Thus, by training the trailer detection DNN with a plurality (e.g., thousands or tens of thousands or more) of images 22 depicting different trailer types, distances, orientations, and environments such as shown, the DNN will be capable of identifying and localizing the trailer in a variety of different situations. Although the examples contained herein illustrate training the DNN to determine or predict presence, category, and position of a trailer under variable conditions of trailer type, orientation relative to the vehicle, distance to the trailer, the weather and environment, lighting conditions of the environment, different road types, and presence or absence of objects in the background, it should be understood that the DNN may be trained to identify and determine characteristics of objects accounting for any variable or combination of variables.

Referring now to FIGS. 6A-10B, a traffic light DNN (which may be the same DNN as the trailer detection DNN or a second separate DNN executing on the same processor or a different processor within the vehicle) detects the presence of traffic lights to provide essential information for driver assistance and automated driving functions of a vehicle. For example, traffic light status is vital information in traffic jam determination (TJD) features and is useful to distinguish actual traffic jam situations from vehicles merely stopped at a traffic signal. Furthermore, traffic light detection may mitigate accidents, such as at intersections.

The traffic light DNN, like the trailer detection DNN, is trained on a plurality of images 122 captured by a camera 19—i.e., a camera with a field of view forward of the vehicle. For example, the camera may be mounted behind the windshield of the vehicle. The image data captured by the camera in the illustrated examples is representative of one or more traffic lights in a variety of different environmental conditions, such as busy streets in a city, multilane roads with varying traffic densities, significant changes in illumination (e.g., from buildings, trees, etc.), overcast skies, partial visibility of the traffic light (e.g., the traffic light is partially occluded by trees, another vehicle, etc.), multiple visible traffic lights, and other images that include other similar-looking lights (e.g., tail lights of other vehicles). The DNN may be trained on the captured image data 122 to determine the presence of traffic lights and determine various conditions of a determined traffic light. For example, the DNN may be trained to determine an illuminated color (e.g., red, yellow, green) or illuminated symbol (e.g., a turning arrow) displayed by the traffic light, or the position of an illuminated traffic light relative to the vehicle (e.g., directing the lane in which the vehicle is travelling or a lane right or left of the lane in which the vehicle is travelling). Determinations of such conditions of traffic lights can influence operation of driver assist systems of the vehicle, such as an autonomous driving system of the vehicle or the like.

Figure 6A:
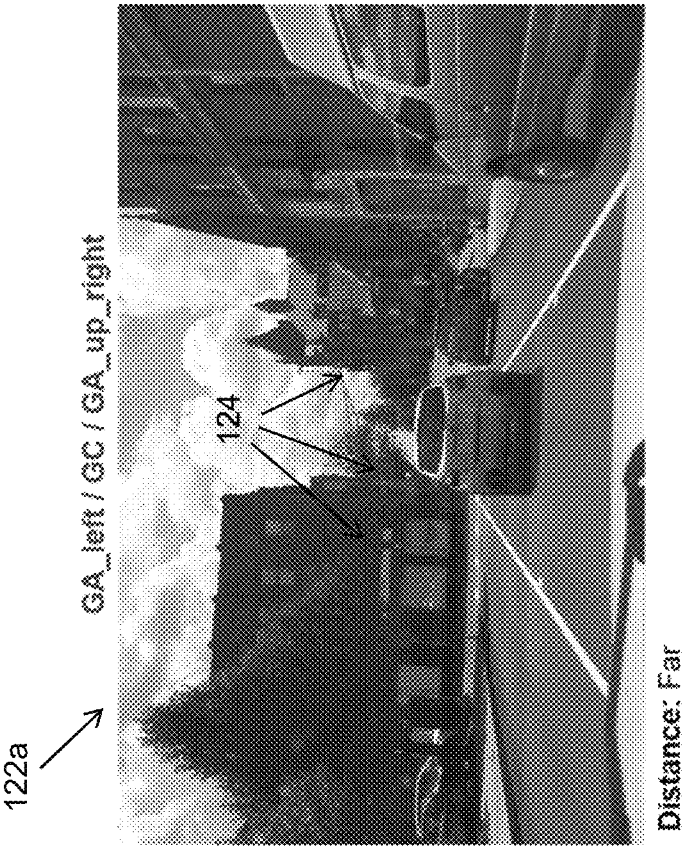
FIGS. 6A-10B are exemplary images of captured image data representative of traffic lights showing various illuminated colors and symbols with the traffic lights at various distances relative to the vehicle and in various environmental conditions.
Figure 6B:
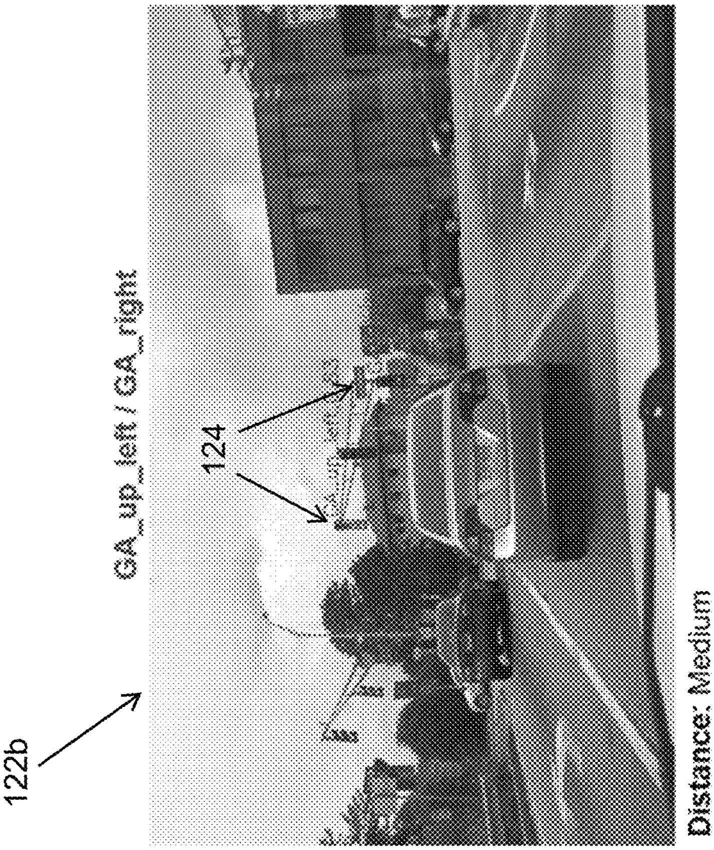
Figure 7A:
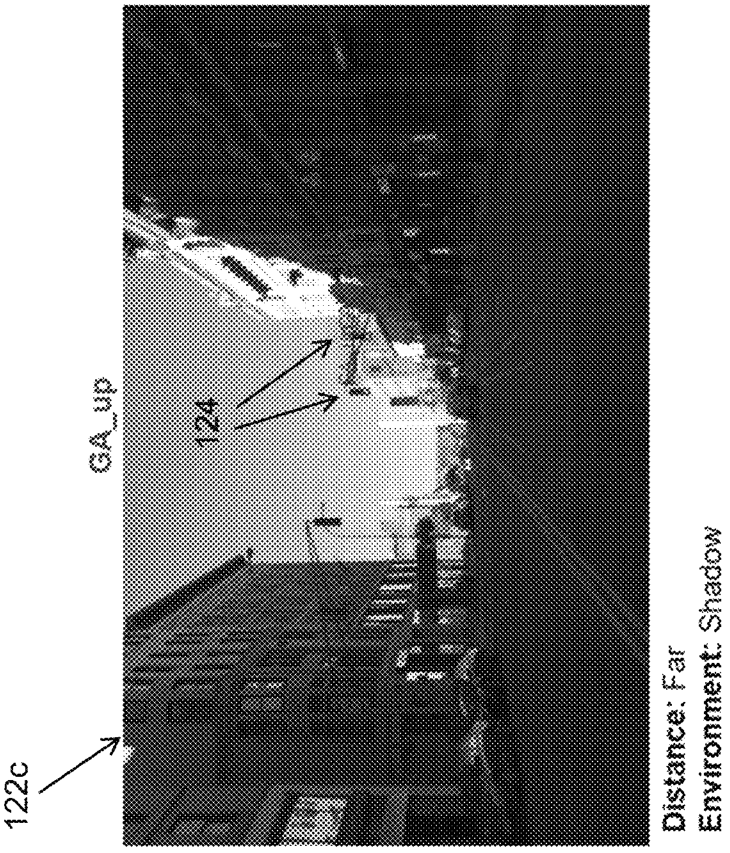
Figure 7B:
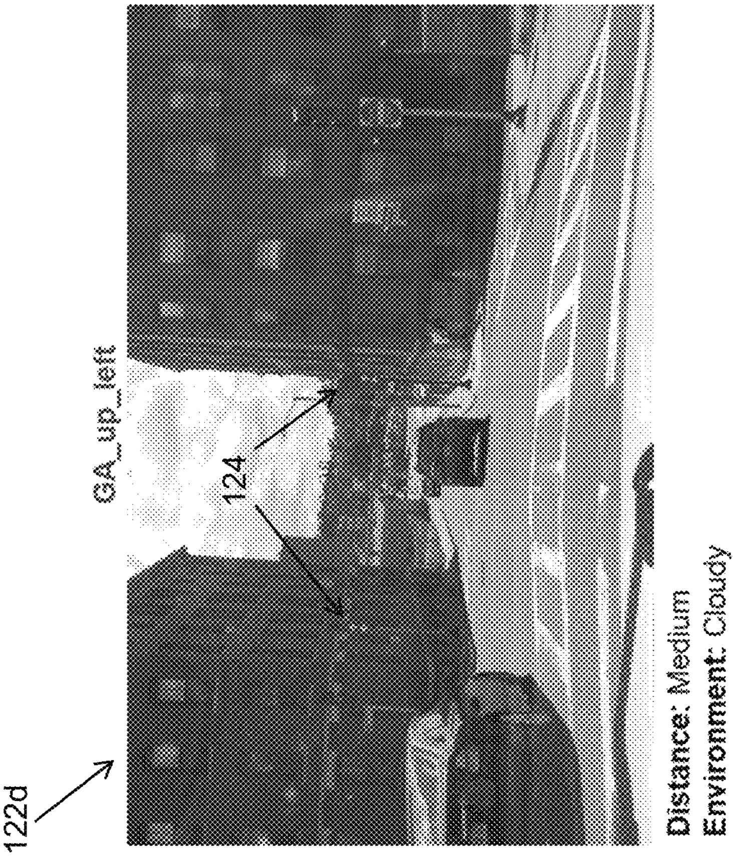
Figure 8A:
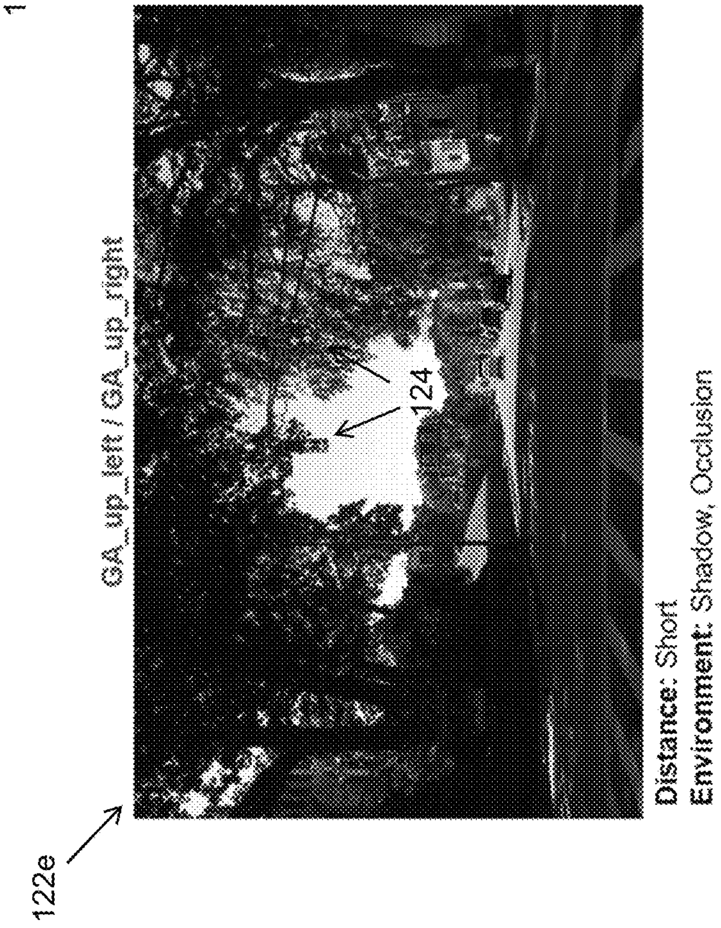
Figure 8B:
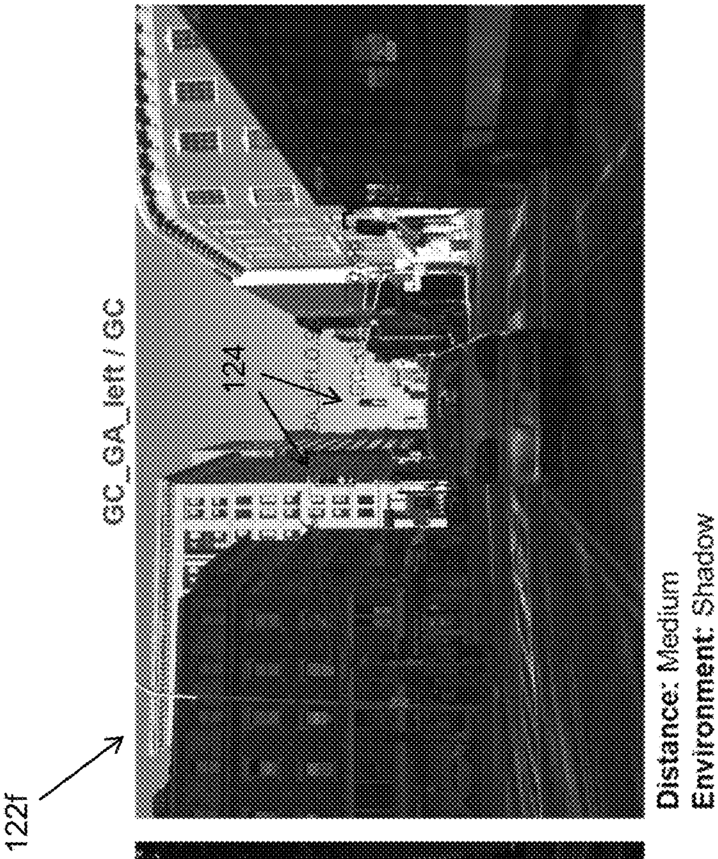
Figure 9A:
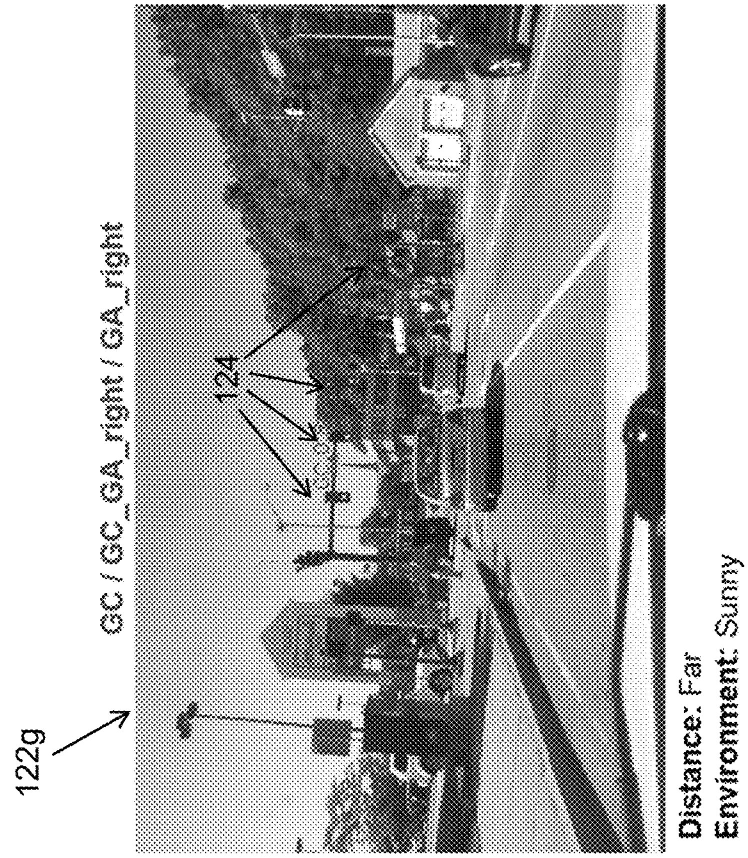
Figure 9B:
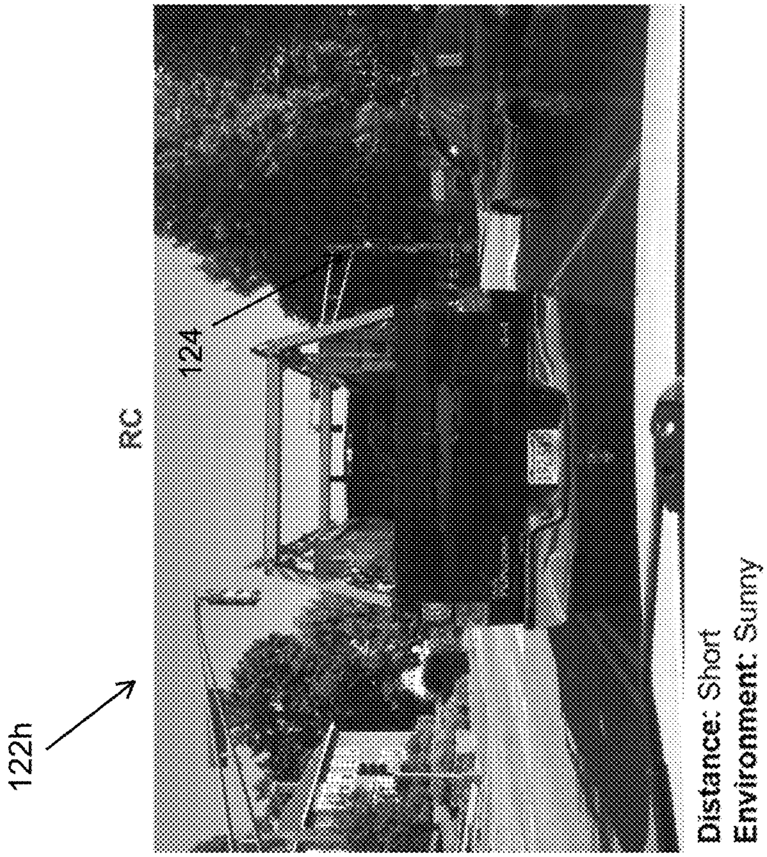
Figure 10A:
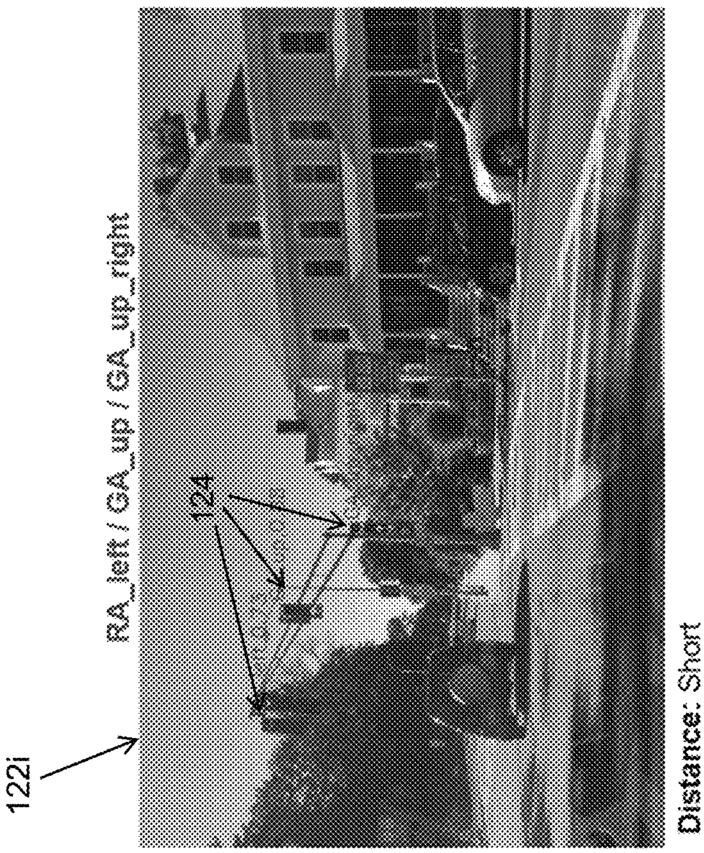
Figure 10B:
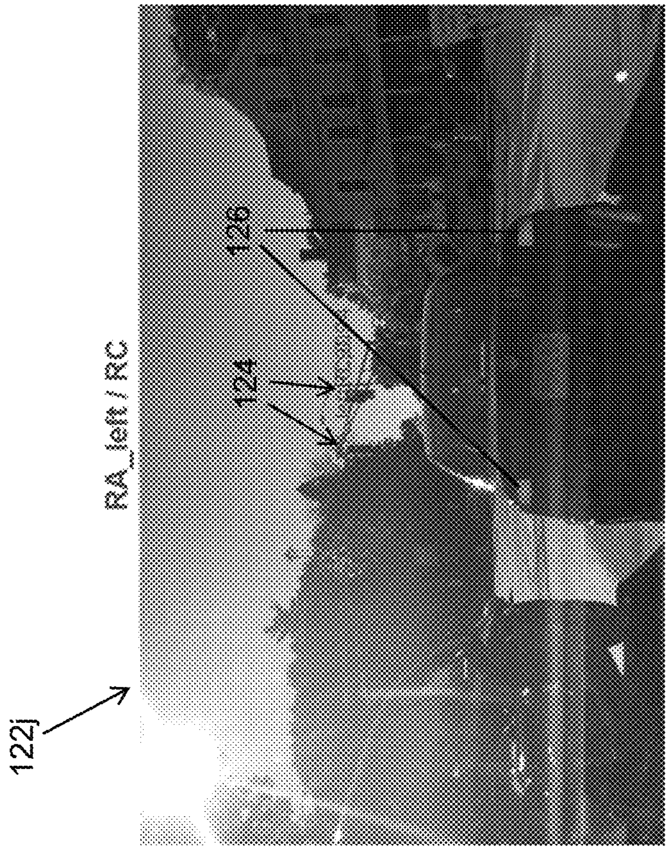

The DNN may be trained with image data 122 representative of traffic lights 124 in a variety of different conditions to enhance accuracy and improve speed of determination of traffic lights by the system. For example, FIG. 6A illustrates an exemplary image 122*a* with traffic lights 124 at a far distance relative to the vehicle in a cloudy environment with a first traffic light determined to be showing an illuminated green, left-pointing arrow, a second traffic light showing an illuminated green circle, and a third traffic light showing both an illuminated green, up-pointing arrow and an illuminated, green right-pointing arrow. FIG. 6B illustrates an image 122*b* with traffic lights 124 at a medium distance in a cloudy environment with a first traffic light determined to be showing both an illuminated, green up-pointing arrow and a green left-pointing arrow and a second traffic light showing a green right-pointing arrow. FIG. 7A illustrates an image 122*c* of traffic lights 124 at a far distance and in shadow where both a first and a second traffic light are determined to be showing illuminated, green up-pointing arrows. FIG. 7B illustrates an image 122*d* of traffic lights 124 at a medium distance in a cloudy environment where both a first and a second traffic light have illuminated, green up-pointing and left-pointing arrows. FIG. 8A illustrates an image 122*e* of the traffic lights 124 at a short distance with both shadows and occlusion where a first traffic light has illuminated, green up-pointing and left-pointing arrows and a second traffic light has illuminated, green up-pointing and right-pointing arrows. FIG. 8B illustrates an image 122*f* of the traffic lights 124 at a medium distance in shadow where a first traffic light is determined to have an illuminated green circle and a green, left-pointing arrow and a second traffic light has an illuminated green circle. FIG. 9A illustrates an image 122*g* of the traffic lights 124 at a far distance in a sunny environment where a first traffic light is determined to have a green circle illuminated, a second traffic light is also determined to have a green circle illuminated, a third traffic light is determined to have both a green circle and a green, right-pointing arrow illuminated, and a fourth traffic light is determined to have a green, right-pointing arrow illuminated. FIG. 9B illustrates an image 122*h* of a traffic light 124 at a short distance in a sunny environment and partially occluded where the traffic light is determined to have a red circle illuminated. FIG. 10A illustrates an image 122*i* of the traffic lights 124 at a short distance and in shadow where a first traffic light has an illuminated left-pointing arrow, a second traffic light has a green, up-pointing arrow, and a third traffic light has both a green, up-pointing arrow and a green, right-pointing arrow. FIG. 10B illustrates an image 122*j* of the traffic lights 124 at a medium stance with direct sunlight and illuminated tail lights 126 in the field of view of the camera, where a first traffic light is determined to have a red, left-pointing arrow and a second traffic light is determined to have a red circle.

FIG. 11 depicts a table 100 that illustrates exemplary components of the object detection system that executes the trailer detection DNN and/or the traffic light DNN. However, any other sufficient processing system may also be used.

Thus, the object detection system with the trailer detection DNN provides the driver and/or other occupant (or another system of the vehicle) with a trailer hitching assist system, trailering assist system, and/or a vehicle towing automation system. The traffic light DNN provides the driver and/or driver assist system with traffic light determination, a traffic violation monitoring system and a traffic jam determination system to differentiate between actual traffic jams and traffic stoppage at traffic lights. Thus, the object detection system offers a lightweight DNN method for real time object detection for various ADAS applications. The model may be trained to detect trailers and/or traffic lights from a grayscale image of a rear camera and a color image of a front camera. The model may achieve a detection accuracy of 96 percent for trailer detection/identification and 94 percent for traffic light detection. Moreover, the DNN model is memory efficient, scalable, and robust.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. 2014-0340510; 2014-0313339; 2014-0347486; 2014-0320658; 2014-0336876; 2014-0307095; 2014-0327774; 2014-0327772; 2014-0320636; 2014-0293057; 2014-0309884; 2014-0226012; 2014-0293042; 2014-0218535; 2014-0218535; 2014-0247354; 2014-0247355; 2014-0247352; 2014-0232869; 2014-0211009; 2014-0160276; 2014-0168437; 2014-0168415; 2014-0160291; 2014-0152825; 2014-0139676; 2014-0138140; 2014-0104426; 2014-0098229; 2014-0085472; 2014-0067206; 2014-0049646; 2014-0052340; 2014-0025240; 2014-0028852; 2014-005907; 2013-0314503; 2013-0298866; 2013-0222593; 2013-0300869; 2013-0278769; 2013-0258077; 2013-0258077; 2013-0242099; 2013-0215271; 2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer assist system, the vehicular trailer assist system comprising:

a camera disposed at a rear portion of a vehicle equipped with the vehicular trailer assist system, the camera viewing at least rearward of the vehicle;

an electronic control unit (ECU) comprising electronic circuitry and associated software;

wherein the electronic circuitry of the ECU comprises an image processor for processing image data captured by the camera;

wherein the ECU executes a single-shot detection deep convolutional neural network (CNN) to determine, via processing image data captured by the camera, presence of a trailer rearward of the vehicle and viewed by the camera;

wherein the CNN, with the trailer not currently hitched to the vehicle and spaced from the vehicle, and responsive to processing image data captured by the camera, determines a position of the trailer relative to the vehicle;

wherein the CNN is trained to determine the presence of the trailer via image data representative of trailers with orientations between 60 degrees and −60 degrees with respect to the vehicle;

wherein the CNN, responsive to determining the position of the trailer, classifies the trailer into one of a plurality of trailer categories; and wherein the ECU, responsive to the CNN determining the position of the trailer relative to the vehicle, generates an output based on the trailer classification to autonomously control the vehicle to align the vehicle with the trailer and navigate the vehicle toward the trailer.

2. The vehicular trailer assist system of claim 1, wherein the CNN is trained to classify the trailer into one of the plurality of trailer categories via image data representative of trailer categories comprising at least one selected from the group consisting of (i) box trailers, (ii) horse trailers, (iii) camper trailers, and (iv) utility trailers.

3. The vehicular trailer assist system of claim 1, wherein the CNN is trained to determine the presence of the trailer via image data representative of trailers at distances between 0 meters and 10 meters from the vehicle.

4. The vehicular trailer assist system of claim 1, wherein the CNN is trained to determine the presence of the trailer via processing of image data captured by the camera in different environments.

5. The vehicular trailer assist system of claim 4, wherein the different environments comprise at least two selected from the group consisting of (i) a sunny environment, (ii) a cloudy environment, (iii) a rainy environment and (iv) a shadowy environment.

6. The vehicular trailer assist system of claim 1, wherein the CNN is trained to determine the presence of the trailer via image data representative of road types comprising at least one selected from the group consisting of (i) asphalt roads, (ii) concrete roads, (iii) snowy roads, (iv) dry roads, and (v) wet roads.

7. The vehicular trailer assist system of claim 1, comprising a second camera disposed at a front portion of the vehicle, the second camera viewing at least forward of the vehicle;

wherein the CNN is trained to determine presence of a traffic light in image data captured by the second camera;

wherein the CNN, responsive to processing image data captured by the second camera, determines a position of a traffic light in the captured image data; and wherein the CNN, responsive to determining the position of the traffic light, determines a status of the traffic light.

8. The vehicular trailer assist system of claim 7, wherein the status of the traffic light comprises at least one selected from the group consisting of (i) an illuminated color of the traffic light, (ii) an illuminated symbol of the traffic light, and (iii) an orientation of the traffic light with respect to the vehicle.

9. The vehicular trailer assist system of claim 7, wherein the ECU, responsive to receiving the status of the traffic light from the CNN, determines presence of a traffic jam.

* * * * *